Patented Oct. 7, 1941

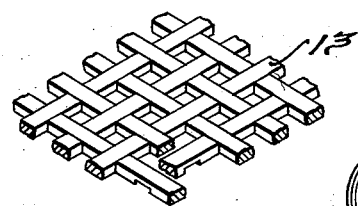
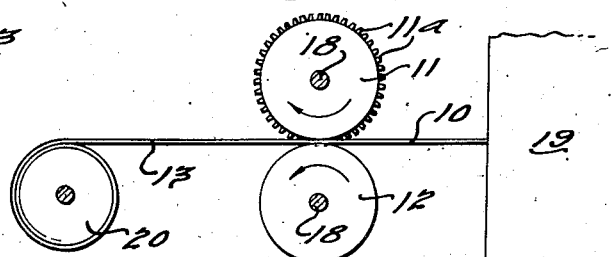
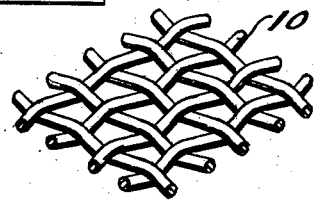
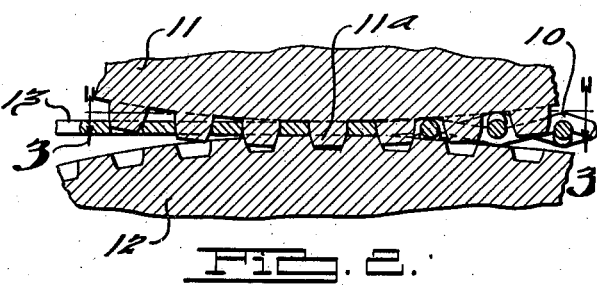
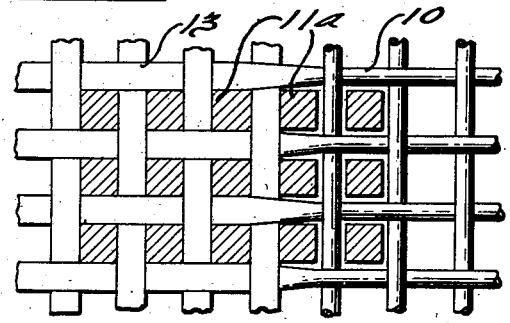
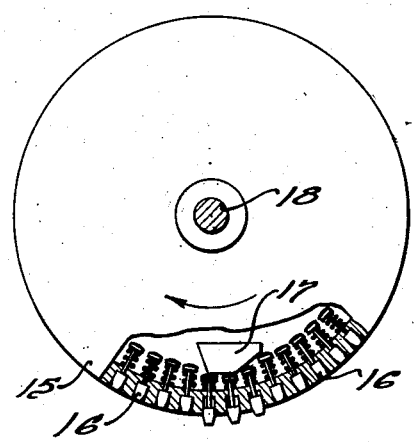
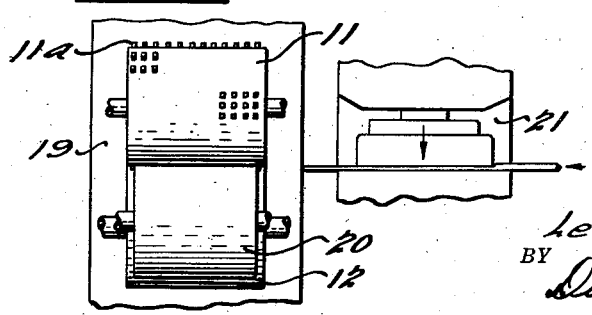

2,257,993

UNITED STATES PATENT OFFICE 2,257,993

METHOD OF MANUFACTURING WIRE SCREENS

Leonard A. Young, Detroit, Mich.

Application November 16, 1939, Serial No. 304,661

7 Claims. (Cl. 140—7)

The present invention relates to a method of manufacturing wire screens and to wire screens resulting therefrom.

It is a principal object of the present invention to provide a method of manufacturing wire screens which is characterized by marked economies in commercial production and the fabrication of screens possessing desirable properties as to uniformity of size and placement of the strands, and in the openings and thickness of the screen.

Another object of the invention is to provide a method of fabricating wire screens in which irregularities on the surface of the finished screen are eliminated.

A further object of the invention is to provide a method of manufacturing wire screens and an improved screen resulting therefrom which is relatively light in weight, which possesses a thinner cross section than screens of comparable size made according to conventional methods, and which possesses a longer life with less rusting particularly at the crossing areas than conventional screens, whereby the screen is enabled to transmit more light than conventional screens and to avoid to a marked extent distortion of the light rays passing therethrough.

Other objects and advantages of this invention will appear in the following description and appended claims, reference being had to the accompanying drawing forming a part of this specification wherein like reference characters designate corresponding parts in the several views.

The method of manufacturing the screen and the screen resulting therefrom embodying the present invention is shown by way of example in the accompanying drawing, in which:

Fig. 1 is a diagrammatic view in side elevation showing the final screen-forming operation;

Fig. 2 is an enlarged sectional view of a portion of the forming rolls shown in Fig. 1;

Fig. 3 is a sectional view taken substantially on the line 3—3 of Fig. 2;

Fig. 4 is an elevation with parts broken away showing a modified form of roller member which may be used in a method embodying the present invention;

Fig. 5 is a fragmentary perspective view showing the finished screen embodying the present invention;

Fig. 6 is a view in perspective of one form of screen used as a blank showing its condition just prior to the completion of the method and the formation of the finished screen shown in Fig. 5; and Fig. 7 is a diagrammatic view in end elevation showing a modification of the final screen-forming operation.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

According to the present invention I propose to form a wire screen by first forming a screen blank which may be woven of warp and weft strands of wire according to conventional methods or which may be formed by crossing at predetermined points a plurality of longitudinally and horizontally extending wire strands. The blank, whether woven or otherwise formed of strands crossed longitudinally and laterally with respect to each other, is formed of wire having a greater diameter than the finished thickness of the screen and is so formed that the spaces between the wire strands in the blank are larger than the spaces in the completed screen. The wire blank is then subjected to pressures, preferably through forming rolls, so as to flatten the wires in the blank and thus reduce the thickness in the blank while at the same time partially closing the spaces between the wire strands. This flattening operation is preferably performed in conjunction with the screen blank forming or weaving operation. However, it may constitute a later separate operation if desired.

This general method is shown diagrammatically in Fig. 1, in which 10 designates the screen blank which is preferably directly fed from the screen blank forming or weaving mechanism 19 through the forming rolls 11 and 12, which, in the present embodiment, rotate in opposite directions. In the embodiment here shown, the roll 11 is a male forming member and the roll 12 is a female member having recesses or slots positioned to mesh with the projections 11a of the member 11, see Fig. 2. The rollers 11 and 12 are adapted to be suitably operatively connected to a supporting and motivating means (not shown) by the shafts shown at 18. The finished screen is designated by the numeral 13. As best shown in Fig. 6, the blank 10 is formed of woven round wire members, possesses surfaces each of which lies in a plurality of planes. This is due to the crimping of the wire during the process of weaving or forming the blank. Also it is to be understood that the diameter of the wires as shown in connection with the section cross wires of Fig. 2, has a thickness appreciably more than the thickness of the finished screen 13. During the travel of the screen blank 10 between the rolls 11 and 12 this thickness is reduced and the finished screen is produced in which, as shown in Fig. 5, the surfaces each lie in a common plane. This operation is particularly illustrated in Fig. 3. Thus there are no projections on the surfaces which cause abrasion of substances coming in contact with the surface of the screen. The finished screen is wound on a revolving drum 20 or otherwise suitably rolled up or collected for storing or shipping purposes.

During the forming operation the spaces in the wire blank 10, as shown in Fig. 3, are occupied by the projecting members of the roll 11. As the pressure is exerted on the wire blank 10 and it is flattened to form the finished screen 13, the wire is forced against all sides of the projecting members on the roll 11 and thus a plurality of openings of predetermined size and of predetermined distribution throughout the finished screen is provided.

It is to be understood that the screen flattening means such as the rollers 11 and 12 and also the drum 20 may form parts of the blank forming or weaving means 19 so that no independent or separate flattening operation need be performed. Naturally, however, this flattening means may be embodied in a separate device, if desired, in which case the blank may be fed into the flattening means from a suitable drum or roll similar to the drum 20.

In Fig. 4 a modified form of roller construction is shown with parts broken away. This roller is intended to be used in place of the roller 11 and it consists of a body portion 15 in which is provided a plurality of spring retracted members 16. The members 16 are pressed outwardly of the periphery of the body 15 by the action of a cam 17. The cam 17 is a stationary cam which contacts the heads of the members 16 and as the body 15 is rotated about the shaft 18 the members 16 which contact the cam 17 are forced outwardly of the periphery thereof. After the finished screen is formed by the rotation of the member 15, the members 16 are freed from contact with the cam 17 and return to the retracted positions. The action of this modified member is substantially the same as the action of the male member 11 except that the projecting members which occupy a position in the spaces between the wire strands forming the screen blank are retracted except during the particular time when the screen blank is being subjected to the screen-forming pressures.

The method of manufacturing screens according to the present invention and screens formed therefrom can be used to produce wire screens of any desired type and I do not desire to be limited in this application to the use of the method herein disclosed for the formation of any particular desired type of screen, such for example as a common window screen, although the invention is of course of particular applicability to this field. The method of manufacturing screens herein disclosed and screens resulting therefrom are particularly desirable for use as guard screens, Fourdrinier wires, and like or similar uses where it is desired to eliminate excessive surface abrasions of substances coming in contact with the surfaces of the screen and where also it is desirable to have regular openings, regularly distributed in the screen member.

While it is believed desirable to utilize the mating rolls 11 and 12 for exerting the pressures on the wire blank which are required to form it into the finished screen of the present invention, it is to be understood that any suitable type of pressure-exerting member or members may be used for shaping the initial blank into the finished screen of the present invention.

Moreover, the wires fed into the blank forming means may be preflattened in the manner indicated in Fig. 7. As there shown the wire fed into the weaving or blank forming means 19 first travels through a suitable pressure exerting means such as the press 21. The flattened wire is then formed into the blank which will, in this event, resemble the blank shown in Fig. 6, except that the wires will be flattened. In this case the rollers 11 and 12 serve to remove any irregularities in the blank created by the weaving or blank forming operation and also ensure an even spacing of the wires to provide a uniform mesh in the manner pointed out hereinbefore. It will be readily understood that only the wires utilized in the weaving or blank forming means 19 to form the cross or weft wires of the blank may be preflattened. In this event the rollers 11 and 12 will flatten the longitudinal or warp wires. Similarly the longitudinal wire alone may be preflattened. It is preferable although not indispensable to preflatten the cross wires only inasmuch as the press 21 may readily be determined as to size and operation so that a single operation thereof on each cross wire will flatten the same for the width of the blank to be formed. This preflattening operation has been found desirable because less power is needed when this method is used instead of using the rollers 11 and 12 alone as the flattening means. It will be understood that a press similar to the press 21 may be substituted for the rollers 11 and 12 and that a preflattening operation may also be utilized in case such a substitution is made. The press 21 preferably forms a part of the weaving or blank forming means 19 but may constitute a separate device if desired. It will be appreciated that the preflattened wire fed into the weaving or blank forming means is suitably cut off at the proper lengths by this blank forming means and is also suitably operated upon thereby to properly form the woven or otherwise formed blank.

It is also to be understood that while I have shown in the drawing a single form of blank, namely, that in which the warp and the weft strands are loosely woven, that the blank may also be formed by joining a plurality of longitudinally and a plurality of horizontally or transversely extending strands in some manner so that they are held in an assembled position and are fed to the forming rolls or other pressure-exerting member while in their predetermined positions. The action of the pressure-exerting screen-forming member is the same in this instance as it is where the blank used is of the woven wire type.

I claim:

1. The method of manufacturing wire screens which includes the novel steps of flattening a round wire, forming a blank by assembling together said flattened wire and a plurality of round wires to provide loosely woven together round warp and flat weft wires, pressing said blank to flatten all of said assembled wires and reduce the thicknesses thereof and to cause reformation of the wire in said blank, whereby the warp and weft wires are of substantially rectangular cross section integrally united in a common plane throughout the entire area of the blank.

2. The method of manufacturing wire screens which includes the novel steps of forming a blank of loosely woven together warp and weft wires after preliminarily flattening said weft wires, pressing said blank to flatten all of said wires and reduce the thicknesses thereof while maintaining a predetermined spacing of said flattened wires, said pressing causing a cold flow and reformation of the wire in said blank, whereby the warp and weft wires are integrally united in a common plane.

3. The method of manufacturing wire screens which includes the novel steps of forming a blank of loosely woven warp and weft wires, and rolling said blank under pressure through forming rollers to flatten said wires and reduce the thicknesses thereof into wires of rectangular cross section throughout, said pressing causing a cold flow and reformation of the wire in said blank, whereby the warp and weft wires are integrally united in a common plane.

4. The method of manufacturing wire screens which includes the novel steps of forming a blank of loosely woven warp and weft wires, rolling said blank through forming rollers to flatten said wires and reduce the thicknesses thereof to a substantially rectangular cross section while mechanically maintaining a predetermined spacing of said flattened wires.

5. The method of manufacturing wire screens which includes the novel steps of preliminarily flattening a round wire, forming a blank of spaced wire in which the said flattened wires constitute the crossed wires, and pressing said blank to entirely flatten all of the wires and reduce the thickness thereof to substantially rectangular cross section while mechanically maintaining a predetermined spacing of said pressed wires.

6. The method of manufacturing wire screens which includes the novel steps of preliminarily flattening a round wire to provide the weft wires for the finished screen, forming a blank of loosely woven round warp wires and flattened weft wires, and thereafter rolling said blank through forming rollers to completely flatten said wires and reduce the thickness thereof.

7. The method of manufacturing wire screens which includes the novel steps of forming a blank of spaced wires, pressing said blank to flatten said wires into substantially rectangular cross section and reduce the thickness thereof while shaping individual spaces between said wires and maintaining a predetermined spacing of said flattened wires.

LEONARD A. YOUNG